US012681847B2

(12) United States Patent
Pöhnl et al.

(10) Patent No.: US 12,681,847 B2
(45) Date of Patent: Jul. 14, 2026

(54) SAFE SHARED-MEMORY COMMUNICATION

(71) Applicant: APEX.AI, INC., Palo Alto, CA (US)

(72) Inventors: Michael Pöhnl, Wurmberg (DE);
Christian Eltzschig, Ludwigsfelde
(DE)

(73) Assignee: APEX.AI, INC., Palo Alto, CA (US)

( * ) Notice: Subject to any disclaimer, the term of this
patent is extended or adjusted under 35
U.S.C. 154(b) by 84 days.

(21) Appl. No.: 18/742,099

(22) Filed: Jun. 13, 2024

(65) Prior Publication Data

US 2025/0298737 A1    Sep. 25, 2025

Related U.S. Application Data

(60) Provisional application No. 63/567,620, filed on Mar.
20, 2024.

(51) Int. Cl.
G06F 12/02 (2006.01)
(52) U.S. Cl.
CPC ................................. G06F 12/023 (2013.01)
(58) Field of Classification Search
CPC ........ G06F 9/544; G06F 9/546; G06F 12/023;
G06F 13/1642; G06F 13/1663; G06F
15/167; G06F 15/17331
See application file for complete search history.

(56) References Cited

U.S. PATENT DOCUMENTS

| | | | |
|---|---|---|---|
| 6,757,756 B1 * | 6/2004 | Lanteigne ............... | G06F 9/546 |
| | | | 710/52 |
| 2005/0044327 A1 * | 2/2005 | Howard .................. | G06F 9/544 |
| | | | 711/147 |
| 2006/0143512 A1 * | 6/2006 | Jia ........................ | G06F 11/1451 |
| | | | 714/13 |
| 2009/0249357 A1 * | 10/2009 | Chanda ................... | G06F 9/546 |
| | | | 719/314 |

(Continued)

OTHER PUBLICATIONS

"eCAL-enhanced Communication Abstraction Layer", Github [online]
[retrieved on May 6, 2024], https://github.com/eclipse-ecal/ecal/
tree/v5.9.0, 5 pages.

(Continued)

*Primary Examiner* — Aracelis Ruiz
(74) *Attorney, Agent, or Firm* — Procopio, Cory,
Hargreaves & Savitch LLP

(57)    ABSTRACT

Embodiments are directed to safe shared-memory commu-
nication between processes. In an embodiment, a data struc-
ture for communicating data references, to data in a shared
memory, from a sender to a receiver, free from interference,
is generated and maintained. The data structure may com-
prise a queue of the data references that is both readable and
writable by the sender and only readable by the receiver, a
write index that indicates a write position within the queue,
wherein the write index is both readable and writable by the
sender and only readable by the receiver, and a read index
that indicates a read position within the queue, wherein the
read index is only readable by the sender and both readable (Continued)

and writable by the receiver. In addition, read and write operations from and to the queue may utilize plausibility checks to detect and resolve potential corruption of the data structure.

19 Claims, 6 Drawing Sheets

(56) References Cited

U.S. PATENT DOCUMENTS

| | | | | |
|---|---|---|---|---|
| 2010/0293280 | A1* | 11/2010 | Namihira | G06F 13/387 |
| | | | | 709/226 |
| 2013/0318339 | A1* | 11/2013 | Tola | H04L 63/0478 |
| | | | | 713/150 |
| 2018/0343238 | A1* | 11/2018 | Tola | H04L 67/1095 |
| 2020/0294558 | A1* | 9/2020 | Yu | G11C 11/409 |
| 2022/0327056 | A1* | 10/2022 | Jeffery | G06F 12/0844 |
| 2022/0374536 | A1 | 11/2022 | Eltzschig et al. | |

OTHER PUBLICATIONS

"Eclipse Zenoh", Github [online] [retrieved on May 6, 2024], https://github.com/eclipse-zenoh/zenoh/tree/0.11.0-dev, 6 pages.
"iceoryx—true zero-copy inter-process-communication", Github [online] [retrieved on May 6, 2024], https://github.com/eclipse-iceoryx/iceoryx/tree/v2.0.3, 5 pages.
European Extended Search Report mailed in European Application No. 25163322.8 on Sep. 11, 2025, 13 pages.

* cited by examiner

200

```
                    ┌─────────┐
                    │  START  │
                    └────┬────┘
                         │
              ◄──────────┤
   205                   ▼
                      ◇ End? ◇ ──Yes──► ( END )
                         │
                        No
   210                   ▼
                   ◇ Send Data? ◇ ──No──►
                         │
                        Yes
   215                   ▼
            ┌───────────────────────────┐
            │    Read the Read Index     │
            └─────────────┬─────────────┘
   220                    ▼
            ┌───────────────────────────┐
            │  Perform Plausibility Check │
            │        on Read Index        │
            └─────────────┬─────────────┘
   225                    ▼
                   ◇ Plausible? ◇ ──No──►  ┌──────────────┐  260
                         │                 │  Safe State  │
                        Yes                └──────┬───────┘
   230                   ▼                        ▼
            ┌───────────────────────────┐  265  ◇ Resolved? ◇ ◄──No──
            │   Write Data Item to Data  │        │
            └─────────────┬─────────────┘        Yes
   235                    ▼
            ┌───────────────────────────┐
            │   Obtain Data Reference to │
            │         Data Item          │
            └─────────────┬─────────────┘
   240                    ▼
            ┌───────────────────────────┐
            │      Read Write Index      │
            └─────────────┬─────────────┘
   245                    ▼
            ┌───────────────────────────┐
            │   Add Data Reference to    │
            │    Queue at Write Index    │
            └─────────────┬─────────────┘
   250                    ▼
            ┌───────────────────────────┐
            │      Update Write Index    │
            └─────────────┬─────────────┘
                          │
```

FIG. 2

SAFE SHARED-MEMORY COMMUNICATION

CROSS-REFERENCE TO RELATED APPLICATIONS

The present application claims priority to U.S. Provisional Patent Application No. 63/567,620, filed on Mar. 20, 2024, which is hereby incorporated herein by reference as if set forth in full.

BACKGROUND

Field of the Invention

The embodiments described herein are generally directed to inter-process communication, and, more particularly, to safe shared-memory communication between processes.

Description of the Related Art

Queues

Queues are fundamental data structures used in computer science and information technology for managing data in a first-in, first-out (FIFO) manner. Queues are used in various fields, including computer programming, data processing, and communication systems. Traditional queues support basic operations such as enqueue (adding an element to the rear of the queue) and dequeue (removing an element from the front of the queue).

A queue generally comprises a linear data structure in which data elements are stored in a particular order. Each element in the queue is associated with a unique position in the queue. Typically, the front of the queue represents the read position (i.e., at which elements are read), and the rear of the queue represents the write position (i.e., to which elements are written).

Lock-Free Queues

Queues may be used to exchange data between two or more threads of execution. In this case, the queues are shared data structures that are affected by data races. A data race occurs when two or more threads access the same queue concurrently, and at least one of these accesses changes the elements in the queue (e.g., by enqueuing or dequeuing an element).

The prevention of data races in queues has traditionally been achieved through blocking algorithms. A blocking algorithm prevents the queue from being concurrently modified or accessed by multiple threads of execution. Such blocking algorithms may employ constructs like a mutual exclusion, frequently referred to as a "mutex." A mutex is a program object that prevents multiple threads from accessing the same shared resource concurrently.

Lock-free algorithms represent a more innovative and efficient approach than blocking algorithms. Lock-free algorithms eliminate the risk of deadlocks and corrupted mutexes. A deadlock is a situation in which a process, sharing the same resource with another process, effectively prevents the other process from accessing that resource, resulting in the other process ceasing to function. Lock-free algorithms offer several advantages over blocking algorithms, but involve higher complexity.

The key to the operation of a lock-free algorithm for accessing a queue lies in atomic operations, such as compare-and-swap (CAS). An atomic operation is an operation that appears to be instantaneous from the perspective of all threads accessing the queue. These atomic operations enable concurrent manipulation of the queue's underlying data structure.

Shared Memory Inter-Process-Communication (IPC)

Operating systems typically come with built-in mechanisms that allow the exchange of data between processes (e.g., Unix domain socket, a message queue, etc.). Shared memory is a widely adopted feature available in almost every major operating system, including Windows™ and operating systems based on the Portable Operating System Interface (POSIX). Shared memory represents a state-of-the-art technique for efficiently sharing data between processes, promoting optimal data exchange and resource utilization.

The utilization of shared memory across processes enables multiple processes, within an operating system, to access and manipulate memory in a shared manner. The primary advantage of shared memory, as an inter-process communication (IPC), as compared to alternative IPC mechanisms, is the elimination of overhead associated with copying data to other memory spaces and a reduction in load on the central processing unit (CPU). Thus, shared memory represents an IPC channel with higher performance over alternatives.

However, shared memory has drawbacks. In particular, shared memory provides the potential for data corruption by a single process, which can impact all other processes and require restoration of interference-free operation.

Zero-Copy Communication

Zero-copy communication represents a communication paradigm that is rooted in shared-memory principles. The core concept of this communication paradigm involves the creation of a shared memory region that is accessible to multiple processes. In this paradigm, the sender of data writes its payload into the shared memory region, and then transmits a data reference, such as a pointer or offset, to this payload to all intended receivers. Advantageously, the sender writes the data just once, and shares the data by merely transmitting a data reference to the payload. Hence, it is aptly named "zero-copy communication." However, implementing zero-copy communication is a demanding task, since the implementation must be capable of handling issues, such as failing processes, without compromising the overall system and the integrity of the shared memory region.

Communication Middleware Based on Shared Memory

There are various commercial and open-source implementations of communication systems that are based on shared memory. Some specific implementations are described below.

Eclipse eCAL

The enhanced Communication Abstraction Layer (eCAL), provided by the Eclipse Foundation of Brussels, Belgium, provides middleware that transfers data using a shared memory file. In version 5.9.0 of Eclipse eCAL™, the sender writes data into the shared memory file, and the receiver reads the data from the shared memory file. Access to the shared memory file is protected by a mutex. In this approach, the messages are exchanged, one by one, via the shared memory file. Eclipse eCAL™ does not support queuing. Thus, the sender is blocked for as long as the receiver is accessing the data, and vice versa.

Eclipse Zenoh

Zenoh, which is also provided by the Eclipse Foundation, represents a communication middleware, written in the Rust programming language. Eclipse Zenoh™ provides a specialized publish-subscribe shared-memory model for zero-copy communication that leverages the shared-memory Rust crate. In version 0.11.0 of Eclipse Zenoh™, the sender initiates communication by creating a POSIX shared memory object, employing a local allocator with a heap strategy. Receivers subsequently access this shared memory object by adhering to a predefined naming convention and obtaining data offsets through integration with the Rust Tokio network framework. Upon completion of data processing, the receiver decrements a reference counter that belongs to the transferred data. Notably, the sender is responsible for proactive garbage collection during allocation to be able to reuse the memory that was used for previous data transfers.

Eclipse Iceoryx

Iceoryx, which is also provided by the Eclipse Foundation, transfers data using lock-free queues. Eclipse Iceoryx™ supports zero-copy communication by using multiple buffers and by only transferring data references to messages via the queues. The messages themselves are stored in a separate shared memory. It is also possible to configure several shared memory regions for storing the messages and to configure the access rights for these shared memory regions. Only selected groups of users are able to read or write the messages stored in the shared memory. This approach is described in U.S. Patent Pub. No. 2022/0374536, published on Nov. 24, 2022. However, this approach only addresses the memory for storing the exchanged messages. The approach fails to consider the data structures in the shared memory that are used to pass the data references to these messages.

Multiple Buffers

Often multiple buffers are used for shared-memory communication. This allows a sender to write a new message while receivers are still reading old messages, which better decouples senders and receivers. Typically, usage of the buffers is tracked by a reference counter, so that a sender can be assigned a free buffer when writing a new message. With this strategy, zero-copy communication can be realized, assuming that senders directly write data to a buffer, and readers directly read the data from the buffers without copying the data to another memory location.

Communication with Freedom from Interference

Freedom from interference is defined in the International Organization for Standardization (ISO) 26262 standard as the "absence of cascading failures between two or more elements that could lead to the violation of a safety requirement." In the context of data communications, this means that a failure on one side of the communication channel cannot lead to a failure on the other side of the communication channel. For a communication channel based on shared memory, this means that senders and receivers cannot block each other's execution or destroy the other's memory.

Weaknesses of the State-of-the-Art

State-of-the-art IPC middleware, based on shared memory, has one or several of the following weaknesses and, therefore, cannot guarantee the freedom from interference needed to have a safe data transfer between processes with different safety criticalities.

Usage of Mutexes or Other Locking Mechanisms

Many shared-memory communication systems (e.g., Eclipse eCAL™) use a mutex to handle multi-threaded access to exchanged messages or access to the control data used to coordinate the data transfer between communication entities. But it is difficult to achieve temporal freedom from interference between the communication entities using a mutex. A process (e.g., software application) might be able to tolerate being blocked by another communication entity for a short period of time. However, the scheduling of threads or the crashing of the other communication entity could lead to the process being blocked for too long or even becoming deadlocked. While there are mechanisms to mitigate these possibilities, such as timeouts or the detection of a corrupted mutex, each of these mechanisms comes with its own drawbacks.

Usage of an Unsafe Mechanism for Transferring the Ownership of Buffers

Shared-memory communication systems that are based on a multi-buffer architecture must pass ownership of the buffers between senders and receivers. Senders need ownership of free buffers to write new messages, and receivers need ownership of written buffers to safely read the messages. The ownership of buffers is often passed by transferring a data reference to a memory buffer, such as a buffer index or a pointer. This can be done by using one of the IPC mechanisms provided by the operating system or with a data structure that is also located in the shared memory. For example, Eclipse Iceoryx™ uses a lock-free queue in the shared memory to pass data references to messages between senders and receivers.

If an IPC mechanism of the operating system is used, the IPC mechanism should fulfill the safety guarantees needed for messages transferred between safety-critical processes. However, many middleware implementations use standard socket-based communication that cannot provide such safety guarantees on most state-of-the-art operating systems.

Usage of Unprotected Control Data in the Shared Memory

If a data structure in the shared memory is used to transfer the ownership of buffers, as in the case of Eclipse Iceoryx™, this data structure must be accessible to both the sender and the receiver. Therefore, this data structure is vulnerable to memory corruption and fails to achieve freedom of interference. If this data structure gets corrupted by one of the communication entities, freedom from interference is no longer available, and failures (e.g., crashes), which are typical for corrupted memory, can occur. For example, the use of a data reference to pass ownership of buffers may result in losing a buffer, which is comparable to a memory leak, and, in the worst case, could lead to the system running out of memory. It may also result in releasing a buffer while it is still being used by receivers, which, in the worst case, could result in a sender writing to a buffer that is still being read by a receiver. This can result in undefined behavior or even crashes.

SUMMARY

Accordingly, methods, systems, and non-transitory computer-readable media are disclosed for safe shared-memory communication between processes, which, for example, guarantees freedom from interference.

In an embodiment, a method comprises using at least one hardware processor to: generate and maintain a first data structure, in shared memory, for communicating data references, to data in the shared memory, from a sender to a receiver, wherein the first data structure comprises a first queue of the data references that is readable and writable by the sender and readable by the receiver, a first write index that indicates a write position within the first queue, wherein the first write index is readable and writable by the sender and readable by the receiver, and a first read index that indicates a read position within the first queue, wherein the first read index is readable by the sender and readable and writable by the receiver.

The method may further comprise, by the sender: determining to send data to the receiver; reading the first read index; determining whether or not the first read index is plausible; when determining that the first read index is implausible, switching to a safe state; and when determining that the first read index is plausible, performing a write operation in the shared memory. The write operation may comprise an enqueue operation that includes: adding a new data reference to the first queue at the write position indicated by the first write index; and updating the first write index. Updating the first write index may comprise incrementing the first write index. The write operation may further comprise, before performing the enqueue operation: writing at least one data item to a data region of the shared memory; and obtaining a data reference, to an address of the at least one data item within the data region of the shared memory, as the new data reference that is added to the first queue in the enqueue operation. The write operation may comprise modifying a data reference in the first queue. The method may further comprise, in the safe state, repairing the first data structure. The method may further comprise, by the sender, generating and maintaining a redundant copy of the first data structure in local memory of the sender, wherein repairing the first data structure comprises, by the sender, restoring the first data structure from the redundant copy of the first data structure in the local memory of the sender. Determining whether or not the first read index is plausible may comprise: reading the first write index; determining whether or not the first read index is greater than the first write index; when determining that the first read index is not greater than the first write index, determining that the first read index is plausible; and when determining that the first read index is greater than the first write index, determining that the first read index is implausible.

The method of Claim 1 may further comprise, by the receiver: reading the first write index; determine whether or not the first write index is plausible; when determining that the first write index is implausible, switching to a safe state; and when determining that the first write index is plausible, performing a read operation in the shared memory. The read operation may comprise a dequeue operation that includes: reading at least one data reference from the first queue at the read position indicated by the first read index; and updating the first read index. Updating the first read index may comprise incrementing the first read index. The read operation may further comprise, after reading the at least one data reference from the first queue: determining whether or not the at least one data reference is plausible; when determining that the at least one data reference is implausible, switching to the safe state; and when determining that the at least one data reference is plausible, reading data at an address referenced by the at least one data reference from a data region of the shared memory. Determining whether or not the at least one data reference is plausible may comprise: determining whether or not the address referenced by the at least one data reference is within the data region of the shared memory; when determining that the address is within the data region of the shared memory, determining that the at least one data reference is plausible; and when determining that the address is not within the data region of the shared memory, determining that the at least one data reference is implausible. The method may further comprise, in the safe state, repairing the first data structure. The method may further comprise, by the receiver, generating and maintaining a redundant copy of the first data structure in local memory of the receiver, wherein repairing the first data structure comprises, by the receiver, restoring the first data structure from the redundant copy of the first data structure in the local memory of the receiver.

The method may further comprise using the at least one hardware processor to: generate and maintain a second data structure, in the shared memory, for communicating data references, to data in the shared memory, from the receiver to the sender, wherein the second data structure comprises a second queue of the data references that is readable and writable by the receiver and readable by the sender, a second write index that indicates a write position within the second queue, wherein the second write index is readable and writable by the receiver and readable by the sender, and a second read index that indicates a read position within the second queue, wherein the second read index is readable by the receiver and readable and writable by the sender. The method may further comprise using the at least one hardware processor to: transfer ownership of data in the shared memory, from the sender to the receiver, by the sender enqueuing data references to the data onto the first queue of the first data structure; and returning ownership of the data in the shared memory, from the receiver to the sender, by the receiver enqueuing those data references to the data onto the second queue of the second data structure.

In an embodiment, the first queue and the first write index are not writable by the receiver, and the first read index is not writable by the sender. In an alternative embodiment, the first queue and the first write index are writable by the receiver, and the first read index is writable by the sender.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 2 illustrates a process for writing to a lock-free data structure, according to an embodiment;

DETAILED DESCRIPTION

Figure 1A:
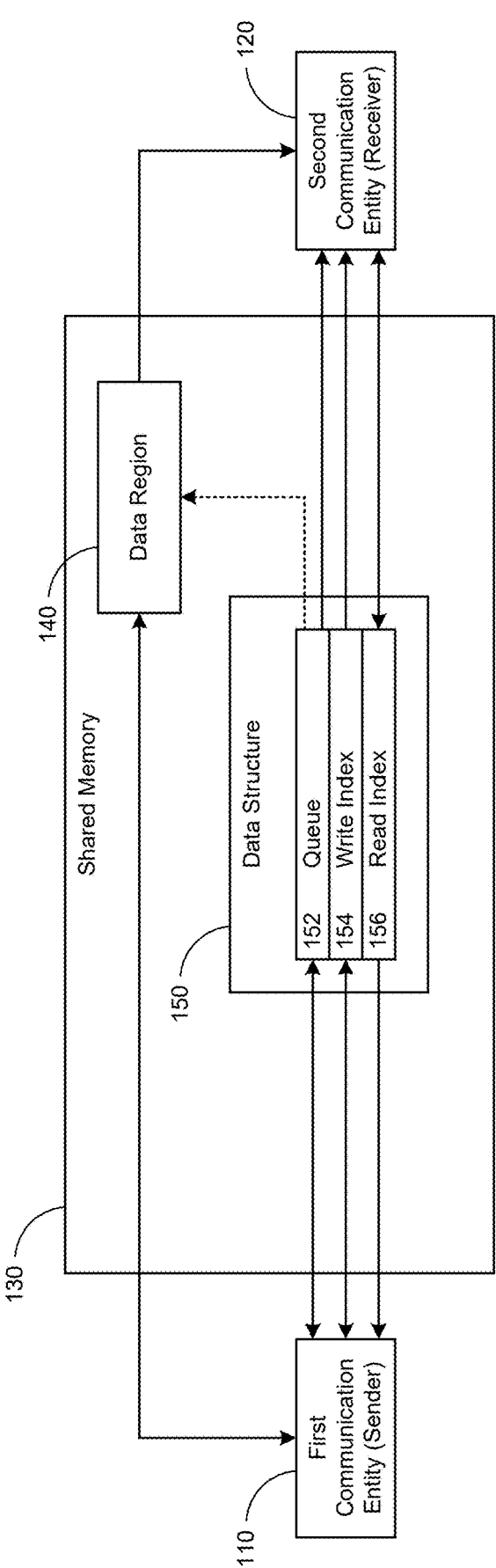
FIGS. 1A-1C illustrate shared memory for communication between a sender and a receiver, according to alternative embodiments.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Introduction

Disclosed embodiments provide a safe mechanism for communicating data using one or more data structures in shared memory. In an embodiment, each data structure is a queue for transferring the ownership of memory regions (e.g., buffers), used for data communication, between at least one sender and at least one receiver. Disclosed embodiments may provide freedom from interference, as defined in the ISO 26262 standard.

Disclosed embodiments may comprise one or more, including potentially all, of the following attributes:

(1) No locking is used. Instead, lock-free data structures (e.g., comprising queues with corresponding control data) are used to transfer the ownership of memory regions in shared memory. This prevents the possibility of blocking and deadlocks.

(2) Each lock-free data structure comprises a plurality of components that each has defined read and write access rights. This prevents senders and receivers from corrupting memory of another communication entity. The components of each lock-free data structure may be distributed to respective regions of the shared memory, such that there is no overlap of information or such that parts of the information are stored redundantly in multiple memory regions. The components of the lock-free data structure can be configured with different access rights. An access right may be that both communication entities have read and write access to the component, one communication entity has write access and the other communication has only read access to the component, one communication entity has read and write access and the other communication entity has no access at all to the component, or the like.

(3) At least one component of the lock-free data structure, stored in a region of the shared memory that can be read by one communication entity and written by another communication entity, is further protected by a plausibility check. The plausibility check may detect when a communication entity with write access has corrupted the component. For example, the plausibility check may check the value of the component against invariants (e.g., determining whether or not a value of the component is outside an allowable value or range of values), compare the value of the component against a redundant value of the component in another region of the shared memory, and/or the like.

(4) The ownership of memory regions in the shared memory may be transferred between senders and receivers with lock-free and memory-separated data structures, according to (1) and (2). This avoids the need to utilize shared control data, such as a reference counter, in order to manage ownership. The utilization of shared control data allows for corruption of the control data by a communication entity.

2. Data Structure

In an embodiment, a lock-free data structure is used to transfer ownership of memory regions, storing data, within the shared memory. The components of this lock-free data structure may be distributed across two or more memory regions within the shared memory. The distribution of components ensures that both the sender and receiver possess the minimum set of access rights required for safe communication. To maintain the integrity of the lock-free data structure, the sender and/or receiver may conduct plausibility checks on the components, which allow them to detect and optionally repair any potential corruption.

FIG. 1A illustrates shared memory 130 for communication between a first communication entity 110 and a second communication entity 120, according to a first embodiment. In this first embodiment, first communication entity 110 is the sender, and second communication entity 120 is the receiver. In other words, first communication entity 110 sends data to second communication entity 120, and second communication entity 120 receives data from first communication entity 110.

Shared memory comprises a data region 140. Data region 140 is protected by a set of access rights. In particular, the access rights to data region 140 include that first communication entity 110 has both read access and write access to data region 140, and second communication entity 120 has read access but no write access to data region 140. In other words, data region 140 is both readable and writable by the sender, and only readable by the receiver. Data region 140 may be configured to store one or more data items, representing payloads, to be sent by the sender to the receiver. For example, data region 140 may encompass an address range of shared memory 130, and first communication entity 110 may have write access to memory blocks at each memory address within the address range. It should be understood that, as used herein, the term "data reference" refers to a pointer or other reference to a memory address within data region 140 of shared memory 130.

Shared memory 130 also comprises a data structure 150, which represents one embodiment of a lock-free data structure. Data structure 150 may comprise a plurality of components. In particular, data structure 150 may comprise a queue 152, a write index 154, and a read index 156. In an embodiment, queue 152 stores data references to data region 140, as opposed to storing the actual data being sent. However, in an alternative embodiment, queue 152 could directly store the data being sent. Write index 154 indicates a write position within queue 152, and read index 156 indicates a read position within queue 152. In particular, the value of write index 154 represents the current write position within queue 152, and the value of read index 156 represents the current read position within queue 152. Collectively, the values of write index 154 and read index 156 represent the status of queue 152.

Each of the components of data structure 150 is protected by a set of access rights. In particular, the access rights to queue 152 include that first communication entity 110 has both read access and write access to queue 152, and second communication entity 120 has read access but no write access to queue 152. The access rights to write index 154 include that first communication entity 110 has both read access and write access to write index 154, and second communication entity 120 has read access but no write access to write index 154. The access rights to read index 156 include that first communication entity 110 has read access but no write access to read index 156, and second communication entity 120 has both read access and write access to read index 156. In other words, queue 152 is readable and writable by the sender and only readable by the receiver, write index 154 is readable and writable by the sender and only readable by the receiver, and read index 156 is only readable by the sender and readable and writable by the receiver.

First communication entity 110 may utilize queue 152 of data structure 150 to send data references to data region 140 to second communication entity 120. In particular, first communication entity 110 may write a data item to data region 140, and enqueue a data reference to the data item in data region 140 onto queue 152. The enqueue operation may comprise adding the data reference onto queue 152 at the write position that is identified by the current value of write index 154 (e.g., representing the rear of queue 152), and then updating (e.g., incrementing by one) the value of write index 154. Alternatively, this enqueue operation may comprise updating (e.g., incrementing by one) the value of write index 154, and then adding the data reference onto queue 152 at the write position that is identified by the updated value of write index 154. However, this alternative approach may lead to problems. In either case, for each data item that is written to data region 140, first communication entity 110 performs an enqueue operation that adds a data reference to that data item within data region 140 to queue 152 and updates write index 154 accordingly.

On the other end of the communication path, second communication entity 120 may utilize queue 152 of data structure 150 to receive data references to data region 140 from first communication entity 110. In particular, second communication entity 120 may dequeue a data reference to a data item in data region 140, and read the data item, to which the data reference refers, from data region 140. The dequeue operation may comprise reading a data reference from queue 152 at the read position that is identified by the current value of read index 156 (e.g., representing the front of queue 152), and then updating (e.g., incrementing by one) the value of read index 156. Alternatively, this dequeue operation may comprise updating (e.g., incrementing by one) the value of read index 156, and then reading the data reference from queue 152 at the read position that is identified by the updated value of read index 156. In either case, second communication entity 120 performs a dequeue operation that reads a data reference to a data item within data region 140 from queue 152 and updates read index 154 accordingly, to thereby effectively remove the data reference from queue 152.

Notably, the number of unread data references, within queue 152, can be determined as the difference between write index 154 and read index 156, which are components to which both first communication entity 110 and second communication entity 120 have read access. Thus, either communication entity may read write index 154 and read index 156, and subtract read index 156 from write index 154 to determine the number of data references to data region 140 within queue 152 that have been enqueued by first communication entity 110 and not yet dequeued by second communication entity 120. This may be particularly useful from the perspective of second communication entity 120, which can dequeue all unread data references at once, based on the difference between write index 154 and read index 156.

Figure 1B:
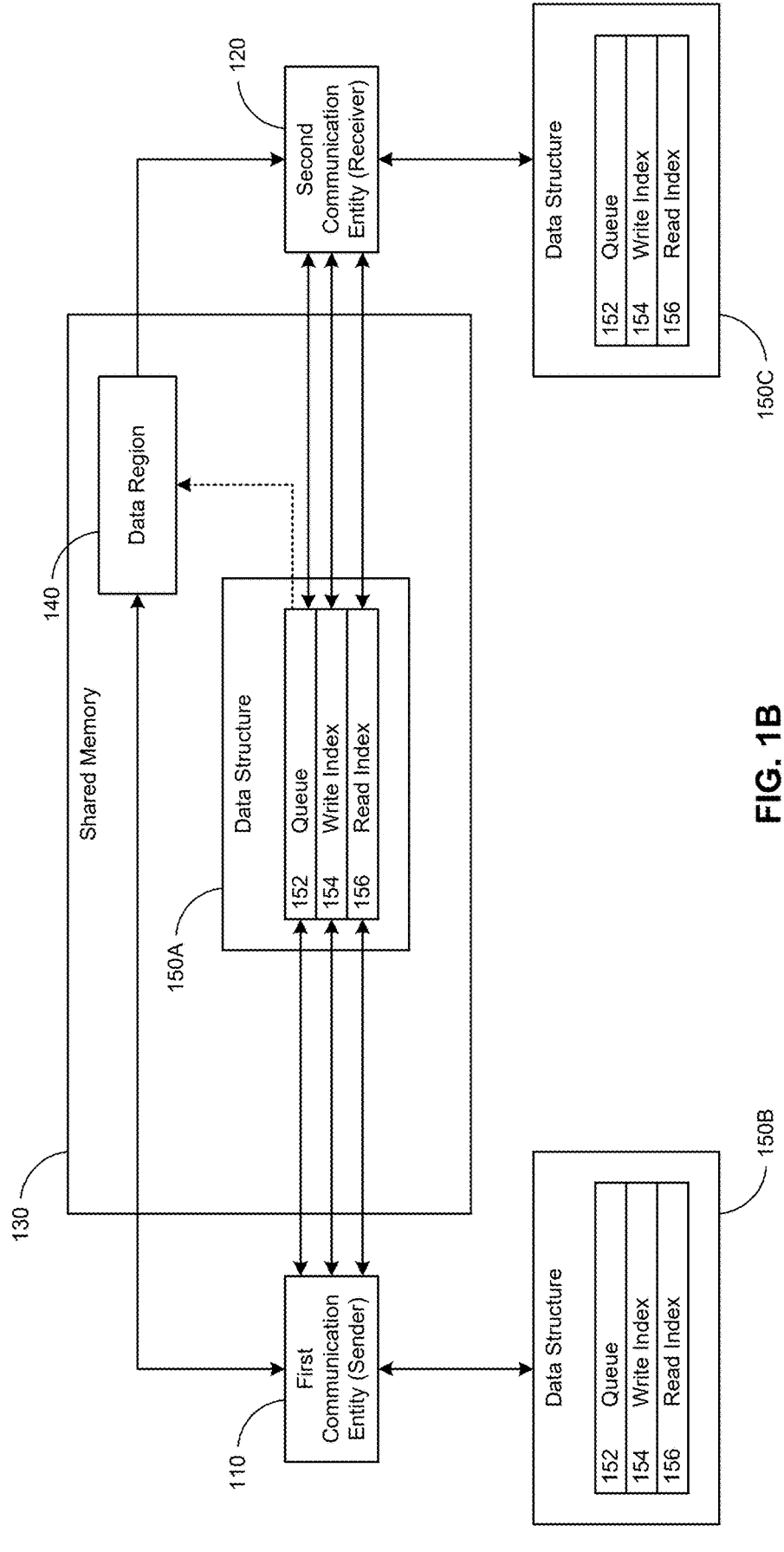

FIG. 1B illustrates shared memory 130 for communication between a first communication entity 110 and a second communication entity 120, according to a second embodiment. As in the first embodiment, first communication entity 110 is the sender, and second communication entity 120 is the receiver.

In this second embodiment, data region 140 is protected by the same set of access rights as in the first embodiment.

However, the components of shared data structure 150A, within shared memory 130, are protected by a different set of access rights. In particular, the access rights are that first communication entity 110 has both read access and write access to each of queue 152, write index 154, and read index 156, and that second communication entity 120 also has both read access and write access to each of queue 152, write index 154, and read index 156. In other words, queue 152 is readable and writable by the sender and readable and writable by the receiver, write index 154 is readable and writable by the sender and readable and writable by the receiver, and read index 156 is readable and writable by the sender and readable and writable by the receiver.

Furthermore, in this second embodiment, each of first communication entity 110 and second communication entity 120 maintain a redundant local copy of shared data structure 150A in shared memory 130. In particular, first communication entity 110 maintains a redundant first local data structure 150B, and second communication entity 120 maintains a redundant second local data structure 150C. Each of local data structures 150B and 150C is synchronized with shared data structure 150A to be identical to shared data structure 150A. However, first local data structure 150B is stored in local memory of first communication entity 110, such that first communication entity 110 has both read access and write access to each component (i.e., queue 152, write index 154, and read index 156) of first local data structure 150B, and second communication entity 120 has no read access and no write access to any component of first local data structure 150B. Similarly, second local data structure 150C is stored in local memory of second communication entity 120, such that second communication entity 120 has both read access and write access to each component (i.e., queue 152, write index 154, and read index 156) of second local data structure 150C, and first communication entity 110 has no read access and no write access to any component of second local data structure 150C.

In this second embodiment, the enqueue operation and dequeue operation may be identical to the enqueue operation and dequeue operation, respectively, in the first embodiment. However, after each enqueue and dequeue operation, each of first communication entity 110 and second communication entity 120 may update their respective local data structures 150B and 150C, within their respective local memories, to match shared data structure 150A in shared memory 130. For example, first communication entity 110 may read each component of shared data structure 150A and synchronize each corresponding component of first local data structure 150B to shared data structure 150A. Similarly, second communication entity 120 may read each component of shared data structure 150A and synchronize each corresponding component of second local data structure 150C to shared data structure 150A.

First communication entity 110 and/or second communication entity 120 may utilize their respective local data structures 150B and 150C to perform plausibility checks, as described elsewhere herein. For example, first communication entity 110 may compare the data references in queue 152 in shared data structure 150 to the data references in queue 152 in first local data structure 150B, compare write index 154 in shared data structure 150 to write index 154 in first local data structure 150B, compare read index 156 in shared data structure 150 to read index 156 in first local data structure 150B, and/or the like, to detect potential corruption in shared data structure 150A. Similarly, second communication entity 120 may compare the data references in queue 152 in shared data structure 150A to the data references in queue 152 in second local data structure 150C, compare write index 154 in shared data structure 150 to write index 154 in second local data structure 150C, compare read index 156 in shared data structure 150 to read index 156 in second local data structure 150C, and/or the like, to detect potential corruption in shared data structure 150A. When detecting potential corruption, first communication entity 110 and/or second communication entity 120 may proceed to a safe state, in which the respective communication entity may attempt to restore or otherwise repair shared data structure 150A from its respective local data structure (e.g., 150B or 150C), using its respective write access to shared data structure 150A.

Although local data structures 150B and 150C are illustrated as comprising full copies of shared data structure 150A, in an alternative embodiment, local data structures 150B and 150C consist of only those components of shared data structure 150A that are necessary for the plausibility checks performed by first communication entity 110 and second communication entity 120. For example, each of local data structures 150B and 150C may consist of only a copy of write index 154 and read index 156, and not a copy of queue 152, if plausibility checks are performed for write index 154 and/or read index 156, but not for the data references themselves. Advantageously, this may reduce the memory footprint required by local data structures 150B and 150C.

Although not required, it is generally contemplated that plausibility checks would be performed prior to processing any information in shared data structure 150A. For example, information may be read from shared data structure 150A, then one or more plausibility checks may be performed on the information that was read from shared data structure 150A (e.g., by comparing the information to corresponding information in local data structure 150B or 150C, determining whether or not the information makes sense, etc.), and, if the information passes the plausibility check(s), then the information is processed and shared data structure 150A and local data structures 150B and 150C are updated accordingly. In the event that the information does not pass the plausibility check(s), the system may enter a safe state as described elsewhere herein.

Figure 1C:
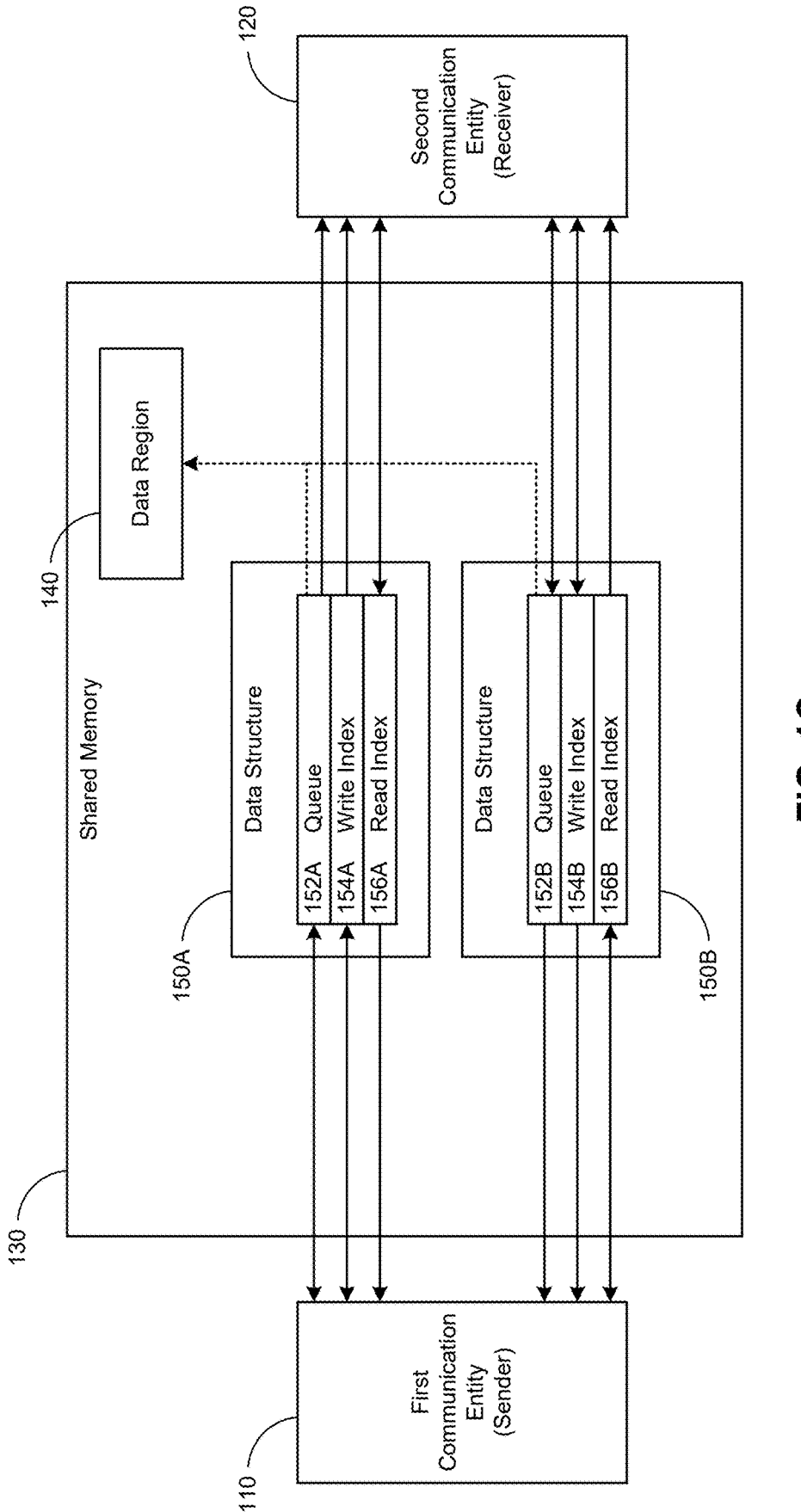

FIG. 1C illustrates shared memory 130 for communication between a first communication entity 110 and a second communication entity 120, according to a third embodiment. As in the first and second embodiments, first communication entity 110 is the sender, and second communication entity 120 is the receiver.

In an untrusted environment, conventional techniques that utilize control data (e.g., a reference counter) are impractical, due to the risk of processes corrupting the control data and causing resource leaks. The third embodiment overcomes this problem using two data structures 150A and 150B within shared memory 130. Each data structure 150A and 150B comprises a set of components that are each protected by a set of access rights, with the set of access rights for the components of second data structure 150B being reversed from the set of access rights for the components of first data structure 150A. In all other respects, data structures 150A and 150B may be similar or identical.

In an embodiment, the access rights to queue 152A in first data structure 150A include that first communication entity 110 has both read access and write access to queue 152A, and second communication entity 120 has read access but no write access to queue 152A. The access rights to write index 154A of first data structure 150A include that first communication entity 110 has both read access and write access to write index 154A, and second communication entity 120 has read access but no write access to write index 154A. The access rights to read index 156A of first data structure 150A include that first communication entity 110 has read access but no write access to read index 156A, and second communication entity 120 has both read access and write access to read index 156A. In other words, queue 152A is readable and writable by the sender and only readable by the receiver, write index 154 is readable and writable by the sender and only readable by the receiver, and read index 156 is only readable by the sender and readable and writable by the receiver.

Conversely, the access rights to queue 152B in second data structure 150B include that second communication entity 120 has both read access and write access to queue 152B, and first communication entity 110 has read access but no write access to queue 152B. The access rights to write index 154B of second data structure 150B include that second communication entity 120 has both read access and write access to write index 154B, and first communication entity 110 has read access but no write access to write index 154B. The access rights to read index 156B of second data structure 150B include that second communication entity 120 has read access but no write access to read index 156B, and first communication entity 110 has both read access and write access to read index 156B. In other words, queue 152A is readable and writable by the receiver and only readable by the sender, write index 154 is readable and writable by the receiver and only readable by the sender, and read index 156 is only readable by the receiver and readable and writable by the sender.

During a transfer of data, first communication entity 110 utilizes first data structure 150A to transfer the ownership of data in data region 140 to second communication entity 120 by enqueuing data references to the data onto queue 152A of first data structure 150A. Second communication entity 120 dequeues the data references from queue 152A of first data structure 150A, and then reads the data, referenced by the dequeued data references, from data region 140. When second communication entity 120 no longer requires the referenced data in data region 140, second communication entity 120 returns ownership of the data to first communication entity 110 by enqueuing the data references to the data onto queue 152B of second data structure 150B. First communication entity 110 dequeues the data references from queue 152B of second data structure 150B, and releases the data, referenced by the dequeued data references, in data region 140 for subsequent writing. In summary, ownership of data in shared memory 130 (e.g., in data region 140) is transferred, from the sender to the receiver, by the sender enqueuing data references to the data onto queue 152A of first data structure 150A, and the ownership of the data in shared memory 130 is returned, from the receiver to the sender, by the receiver enqueuing those data references to the data onto queue 152B of second data structure 150B. This two-structure approach enhances security and reliability in untrusted environments, and mitigates the risks associated with traditional techniques for transferring the ownership of data.

It should be understood that the three embodiments, described above, represent only three example embodiments, and therefore, do not represent all possible embodiments. These embodiments may be combined with each other, comprise additional data structures, comprise different data structures (e.g., with fewer, additional, and/or different components), and/or the like. The present disclosure is not directed to any specific implementation of data structure 150.

Rather, the present disclosure is directed to an approach that separates a data structure in shared memory 130 into distinct components, which each has a set of access rights for first communication entity 110 and second communication entity 120, and enables plausibility checks to be performed when one communication entity is reading from the data structure to which the other communication entity has write access. In certain embodiments (e.g., the first and third embodiments described above), each data structure 150 is divided into at least two segments with different access rights. To the first segment (e.g., comprising or consisting of queue 152 and write index 154), first communication entity 110 (e.g., the sender) has write access and second communication entity 120 (e.g., the receiver) has read-only access. To the second segment (e.g., comprising or consisting of read index 156), second communication entity 120 (e.g., the receiver) has write access and first communication entity 110 (e.g., the sender) has read-only access. Alternative embodiments may utilize a data structure with three or more segments, provide both first communication entity 110 and second communication entity 120 with write access to at least one segment of the data structure (e.g., as in the second embodiment described above), and/or the like.

A data structure 150 or set of data structures 150 (e.g., 150A-150C in the second embodiment, 150A and 150B in the third embodiment, etc.) may be generated and maintained, in shared memory 130, for each communication path between a pair of communication entities. For example, first communication entity 110 may send data to a plurality of second communication entities 120 via respective sets of one or more data structures 150, within the same shared memory 130 or within respective shared memories 130. In addition, second communication entity 120 may send data to first communication entity 110 via a set of one or more data structures 150, within the same shared memory 130 or a different shared memory 130, such that there is two-way communication (i.e., communication paths in both directions) between first communication entity 110 and second communication entity 120. Generally, for each communication path that requires safe communication that is free from interference and utilizes a shared memory 130, within a system, a data structure 150 may be generated and maintained, in the shared memory 130, for communicating data references, to data (e.g., within data region 140) in the shared memory 130, from the sender to the receiver. In an embodiment in which ownership of data is returned by the receiver to the sender (e.g., the third embodiment described above), a second data structure 150B may also be generated and maintained, in the shared memory 130, for communicating the data references from the receiver to the sender, thereby returning ownership to the referenced data in data region 140 to the sender. Shared memory 130 and/or data structures 150 may be generated by first communication entity 110, as the sender, by second communication entity 120, as the receiver, and/or by an overarching process, for example, that manages shared memory 130 for a plurality of communication entities.

3. Write Process

FIG. 2 illustrates a process 200 for writing to data structure 150, according to an embodiment. Process 200 may be executed by first communication entity 110, as the sender of data. While process 200 is illustrated with a certain arrangement and ordering of subprocesses, process 200 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 205, process 200 may determine whether or not to end. Process 200 may execute for as long as first communication entity 110 executes or performs communications with second communication entity 120. In this case, process 200 may determine to end when first communication entity 110 shuts down or has ended communications with second communication entity 120. When determining to end (i.e., "Yes" in subprocess 205), process 200 may end. Otherwise, when not determining to end or when determining to continue (i.e., "No" in subprocess 205), process 200 may proceed to subprocess 210.

In subprocess 210, process 200 may determine whether or not to send data to the receiver. In particular, first communication entity 110 may determine to write one or more data items to data region 140 of shared memory 130. Process 200 may determine to write a data item whenever first communication entity 110 needs to communicate a data item to second communication entity 120. When determining to write at least one data item to data region 140 (i.e., "Yes" in subprocess 210), process 200 may proceed to subprocess 215. Otherwise, when not determining to write a data item to data region 140 (i.e., "No" in subprocess 210), process 200 may return to subprocess 205 and continue to wait for a need to communicate a data item to second communication entity 120.

In subprocess 215, process 200 may read read index 156. In particular, first communication entity 110 may read the value of read index 156 of data structure 150, in shared memory 130 between first communication entity 110 and second communication entity 120. As discussed elsewhere herein, first communication entity 110 may have read access to read index 156. Read index 156 identifies the current read position within queue 152 of data structure 150.

In subprocess 220, process 200 may perform a plausibility check on the current value of read index 156. At a high level, the plausibility check may determine whether or not the current value of read index 156 is plausible, for example, relative to the current value of write index 154. For example, subprocess 220 may read both write index 154 and read index 156, and determine whether or not the current value of read index 156 is greater than the current value of write index 154. When the current value of read index 156 is greater than the current value of write index 154, subprocess 220 may output a determination that the current value of read index 156 is implausible. Conversely, when the current value of read index 156 is not greater than the current value of write index 154, subprocess 220 may output a determination that the current value of read index 156 is plausible. It should be understood that this is simply one example of a plausibility test, and that the plausibility check may comprise additional or alternative plausibility tests to detect whether or not read index 156 is plausible. The plausibility check may ensure that reads and writes are not performed to memory regions that are out of bounds to queue 152 and/or shared memory 130.

In subprocess 225, the output of the plausibility check in subprocess 220 may be evaluated to determine whether or not read index 156 was determined to be plausible. When determining that read index 156 is plausible (i.e., "Yes" in subprocess 225), process 200 may proceed to subprocess 230. Otherwise, when determining that read index 156 is implausible (i.e., "No" in subprocess 225), process 200 may proceed to subprocess 260.

In subprocess 230, after determining that the current value of read index 156 is plausible, process 200 may write the data item(s) to data region 140 in shared memory 130. As discussed elsewhere herein, first communication entity 110 may have write access to data region 140.

In subprocess 235, process 200 may obtain a data reference to the data item(s) that were written to data region 140. It should be understood that the data reference is to an address of the data item(s) within data region 140 of shared memory 130.

In subprocess 240, process 200 may read write index 154. In particular, first communication entity 110 may read the value of write index 154 of data structure 150, in shared memory 130 between first communication entity 110 and second communication entity 120. As discussed elsewhere herein, first communication entity 110 has read access to write index 154. Write index 154 identifies the current write position within queue 152 of data structure 150.

In subprocess 245, process 200 may add the data reference, obtained in subprocess 235, as a new data reference, to queue 152 at the write position indicated by the value of write index 154, read in subprocess 240. As discussed elsewhere herein, first communication entity 110 has write access to queue 152.

In subprocess 250, process 200 may update write index 154. As discussed elsewhere herein, first communication entity 110 has write access to write index 154. In a contemplated implementation, updating write index 154 in subprocess 250 comprises incrementing write index 154 by a value of one (or alternative step value). However, the particular implementation of subprocess 250 will depend on the particular implementation of write index 154 and read index 156.

Subprocesses 230-250 represent an enqueue operation, in which first communication entity 110 adds a data reference, to a data item within data region 140, to queue 152, at a position indicated by the value of write index 154, and updates write index 154 accordingly. Alternatively, subprocesses 230-250 may be replaced with another type of write operation, such as a dequeue operation in which first communication entity 110 removes a data reference from queue 152, a modification operation in which first communication entity 110 modifies an existing data reference in queue 152, or the like. Although not specifically illustrated, the write operation may include a plausibility check on write index 154 (e.g., between subprocesses 240 and 245), which may be similar to the plausibility check on read index 156 in subprocess 220. In any case, after the write operation has been completed, process 200 may return to subprocess 205.

In subprocess 260, process 200 may switch to a safe state to prevent, mitigate, repair, and/or otherwise address potential corruption of data structure 150. For example, the safe state may comprise or initiate a process that attempts to repair data structure 150 by attempting to determine the correct value of read index 156 (e.g., from local data structure 150B), restoring data structure 150 from a redundant copy of data structure 150 (e.g., restoring shared data structure 150A from local data structure 150B), reinitializing data structure 150, resetting communications between first communication entity 110 and second communication entity 120, and/or the like. As discussed elsewhere herein, first communication entity 110 may generate and maintain a redundant copy of data structure 150 in local memory, in which case, first communication entity 110 may attempt to repair data structure 150 by restoring data structure 150 from the redundant copy of data structure 150 in the local memory of first communication entity 110.

In subprocess 265, process 200 may determine whether or not the potential corruption of data structure 150 has been resolved by subprocess 260. When determining that the potential corruption of data structure 150 has been resolved (i.e., "Yes" in subprocess 265), process 200 may return to subprocess 205. Otherwise, when determining that the potential corruption of data structure 150 has not been resolved (i.e., "No" in subprocess 265), process 200 may remain in subprocess 260 to continue to attempt to resolve the potential corruption of data structure 150. In an embodiment, each subsequent iteration of subprocess 260 may escalate the manner in which repair of data structure 150 is attempted, for example, by taking a more aggressive repair action than the preceding iteration of subprocess 260.

4. Read Process

Figure 3:
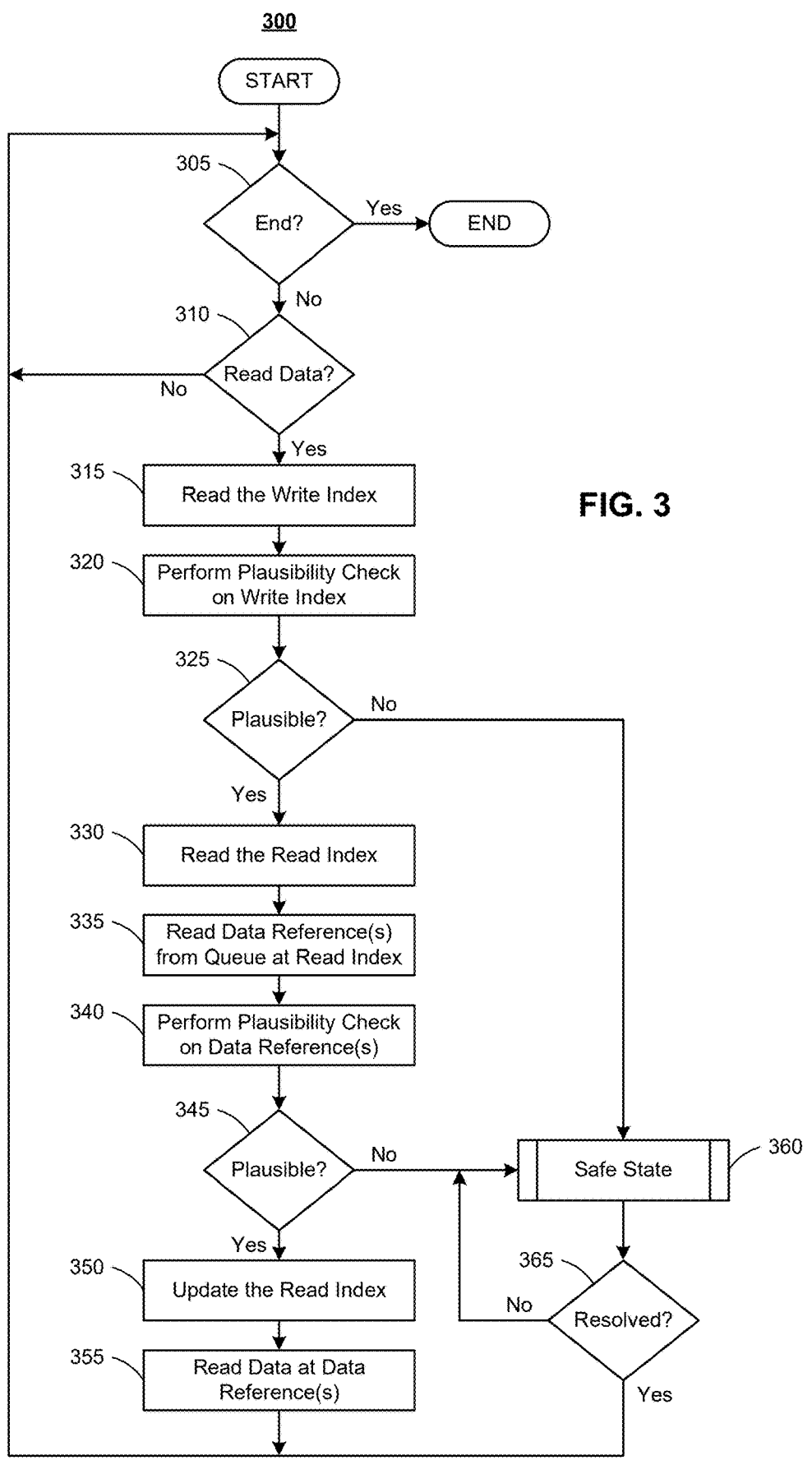
FIG. 3 illustrates a process for reading from a lock-free data structure, according to an embodiment.

FIG. 3 illustrates a process 300 for reading from data structure 150, according to an embodiment. Process 300 may be executed by second communication entity 120, as the receiver of data. While process 300 is illustrated with a certain arrangement and ordering of subprocesses, process 300 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 305, process 300 may determine whether or not to end. Process 300 may execute for as long as second communication entity 120 executes or performs communications with first communication entity 110. In this case, process 300 may determine to end when second communication entity 120 shuts down or has ended communications with first communication entity 110. When determining to end (i.e., "Yes" in subprocess 305), process 300 may end. Otherwise, when not determining to end or when determining to continue (i.e., "No" in subprocess 305), process 300 may proceed to subprocess 310.

In subprocess 310, process 300 may determine whether or not to read data from the sender. Process 300 may determine to read data whenever the value of write index 154 changes, periodically (e.g., at fixed time intervals, after completely processing previously received data, etc.), whenever second communication entity 120 expects a communication from first communication entity 110, and/or the like. When determining to read data (i.e., "Yes" in subprocess 310), process 300 may proceed to subprocess 315. Otherwise, until determining to read data (i.e., "No" in subprocess 310), process 300 may return to subprocess 305 and wait.

In subprocess 315, process 300 may read write index 154. In particular, second communication entity 120 may read the value of write index 154 of data structure 150, in shared memory 130 between first communication entity 110 and second communication entity 120. As discussed elsewhere herein, second communication entity 120 may have read access to write index 154. Write index 154 identifies the current write position within queue 152 of data structure 150.

In subprocess 320, process 300 may perform a plausibility check on the current value of write index 154. At a high level, the plausibility check may determine whether or not the current value of write index 154 is plausible, for example, relative to the current value of read index 156. For example, subprocess 320 may read both write index 154 and read index 156, and determine whether or not the current value of write index 154 is less than the current value of read index 156. If the current value of write index 154 is less than the current value of read index 156, subprocess 320 may output a determination that the current value of write index 154 is implausible. Conversely, when the current value of write index 154 is not less than the current value of read index 156, subprocess 320 may output a determination that the current value of write index 154 is plausible. It should be understood that this is simply one example of a plausibility test, and that the plausibility check may comprise additional or alternative plausibility tests to detect whether or not write index 154 is plausible. The plausibility check may ensure that writes and reads are not performed to memory regions that are out of bounds to queue 152 and/or shared memory 130.

In subprocess 325, the output of the plausibility check in subprocess 320 may be evaluated to determine whether or not write index 154 was determined to be plausible. When determining that write index 154 is plausible (i.e., "Yes" in subprocess 325), process 300 may proceed to subprocess 330. Otherwise, when determining that write index 154 is implausible (i.e., "No" in subprocess 325), process 300 may proceed to subprocess 360.

In subprocess 330, process 300 may read read index 156. In particular, second communication entity 120 may read the value of read index 156 of data structure 150, in shared memory 130 between first communication entity 110 and second communication entity 120. As discussed elsewhere herein, second communication entity 120 has read access to read index 156. Read index 156 identifies the current read position within queue 152 of data structure 150.

In subprocess 335, process 300 may read one or more data references from queue 152, starting at the read position indicated by the value of read index 156, read in subprocess 330. As discussed elsewhere herein, second communication entity 120 has read access to queue 152. In an embodiment of subprocess 335, process 300 may read all unread data references from queue 152 at once. In particular, second communication entity 120 may read all data references starting at the value of read index 156, read in subprocess 330, and ending at or immediately before the value of write index 154, read in subprocess 315. In such an embodiment, the number of data reference(s) that are read may be equal to the difference between the value of write index 154 and the value of read index 156. In an alternative embodiment, process 300 may read only a single data reference from queue 152 at a time.

In subprocess 340, process 300 may perform a plausibility check on the data reference(s), read in subprocess 335. At a high level, the plausibility check may determine whether or not the data reference(s) are plausible. For example, second communication entity 120 may store the address range encompassed by data region 140 in shared memory 130. In this case, subprocess 340 may determine whether or not each of the data reference(s) is to an address within this address range. If a data reference is to an address outside of the address range of data region 140, subprocess 340 may output a determination that the data reference(s) are implausible. Conversely, if each data reference points to an address within the address range of data region 140, subprocess 340 may output a determination that the data reference(s) are plausible. More generally, process 300 determines whether or not the address referenced by each data reference is within data region 140 of shared memory 130. It should be understood that this is simply one example of a plausibility test, and that the plausibility check may comprise additional or alternative plausibility tests to detect whether or not the data reference(s) are plausible. The plausibility check may ensure that reads are not performed to memory regions that are out of bounds of data region 140 and/or shared memory 130.

In subprocess 345, the output of the plausibility check in subprocess 340 may be evaluated to determine whether or not the data reference(s) were determined to be plausible. When determining that the data reference(s) are plausible (i.e., "Yes" in subprocess 345), process 300 may proceed to subprocess 350. Otherwise, when determining that a data reference is implausible (i.e., "No" in subprocess 345), process 300 may proceed to subprocess 360.

In subprocess 350, process 300 may update read index 156. As discussed elsewhere herein, second communication entity 120 has write access to read index 156. In a contemplated implementation, updating read index 156 in subprocess 350 comprises incrementing read index 156 by a value of one (or alternative step value). However, the particular implementation of subprocess 350 will depend on the particular implementation of write index 154 and read index 156.

In subprocess 355, for each of the data reference(s) read in subprocess 335, process 300 reads the data (e.g., one or more data items) at the address referenced by that data reference from data region 140 of shared memory 130. It should be understood that second communication entity 120 may process the data, read in subprocess 355, according to the particular function of second communication entity 120. The particular manner in which the data are used is not relevant to the operation of process 300, which only relates to reading the data sent by first communication entity 110.

Subprocesses 330-350 represent a dequeue operation, in which second communication entity 120 removes a data reference to a data item within data region 140 from queue 152, at a position indicated by the value of read index 156, and updates read index 156 accordingly. Alternatively, subprocesses 330-350 may be replaced with another type of read operation, such as reading a modified data reference from queue 152. In any case, after subprocess 355, process 300 may return to subprocess 305.

In subprocess 360, process 300 may switch to a safe state to prevent, mitigate, repair, and/or otherwise address potential corruption of data structure 150. Subprocess 360 may be similar or identical to subprocess 260 in process 200. For example, the safe state may comprise or initiate a process that attempts to repair data structure 150 by attempting to determine the correct value of write index 154 (e.g., from local data structure 150C) or a data reference (e.g., read in subprocess 335), restoring data structure 150 from a redundant copy of data structure 150 (e.g., restoring shared data structure 150A from local data structure 150C), reinitializing data structure 150, resetting communications between first communication entity 110 and second communication entity 120, and/or the like. As discussed elsewhere herein, second communication entity 120 may generate and maintain a redundant copy of data structure 150 in local memory, in which case, second communication entity 120 may attempt to repair data structure 150 by restoring data structure 150 from the redundant copy of data structure 150 in the local memory of second communication entity 120.

In subprocess 365, process 300 may determine whether or not the potential corruption of data structure 150 has been resolved by subprocess 360. Subprocess 365 may be similar or identical to subprocess 265 in process 200. When determining that the potential corruption of data structure 150 has been resolved (i.e., "Yes" in subprocess 365), process 300 may return to subprocess 305. Otherwise, when determining that the potential corruption of data structure 150 has not been resolved (i.e., "No" in subprocess 365), process 300 may remain in subprocess 360 to continue to attempt to resolve the potential corruption of data structure 150. In an embodiment, each subsequent iteration of subprocess 360 may escalate the manner in which repair of data structure 150 is attempted, for example, by taking a more aggressive repair action than the preceding iteration of subprocess 360.

5. Example Applications

Disclosed embodiments of shared memory 130 (e.g., including data structure 150), process 300, and/or process 400 may be used for any communication between a pair of entities, such as inter-process communications between two processes. The disclosed embodiments are particularly beneficial for high-performance communication that requires freedom from interference between the sender (e.g., first communication entity 110) and the receiver (e.g., second communication entity 120). For example, disclosed embodiments may be used in frameworks and/or middleware solutions for sensor-intensive systems. Examples of sensor-intensive systems include, without limitation, control systems for robots, autonomous driving systems for vehicles or drones, and the like.

As an example, first communication entity 110 may be a sensing process that measures one or more parameters, and second communication entity 120 may be a control process that makes decisions and/or performs actions based on the measured parameter(s). In this case, the sensing process may utilize data structure 150 in shared memory 130 to transfer the ownership of the measured parameter values, within data region 140, to the control process. It should be understood that this is simply one example, and that there are a virtually infinite number of other contexts and scenarios in which disclosed embodiments may be used.

Disclosed embodiments are described with respect to a first communication entity 110 as a sender and a second communication entity 120 as a receiver. However, disclosed embodiments are not limited to one-way communications. Rather, first communication entity 110 may also be a receiver and/or second communication entity 120 may also be a sender. In this case, there may be a separate shared memory 130, with a separate data structure 150, for each communication path (i.e., a specific communication direction between first communication entity 110 and second communication entity 120). Alternatively, there may be a single shared memory 130, with separate data structures 150 and potentially separate data regions 140 for each communication path.

In addition, it should be understood that first communication entity 110 and/or second communication entity 120 may communicate with other entities, besides just each other. In this case, there may be a separate shared memory 130 for each pair of communication entities or for each communication path between communication entities. Alternatively, three or more communication entities may utilize the same shared memory 130, with a separate data structure 150 and potentially separate data region 140 for each communication path between communication entities. In general, there may be a data structure 150 or pair of data structures 150 (e.g., in the case of the third embodiment described above) on each communication path and for each communication direction between a pair of communication entities. These data structure(s) 150 may be stored within a single shared memory 130 or separate shared memories 130. Thus, it should be understood that a communication entity may implement both process 200, for sending data to another communication entity, and process 300, for receiving data from another communication entity.

6. Example Processing System

Figure 4:
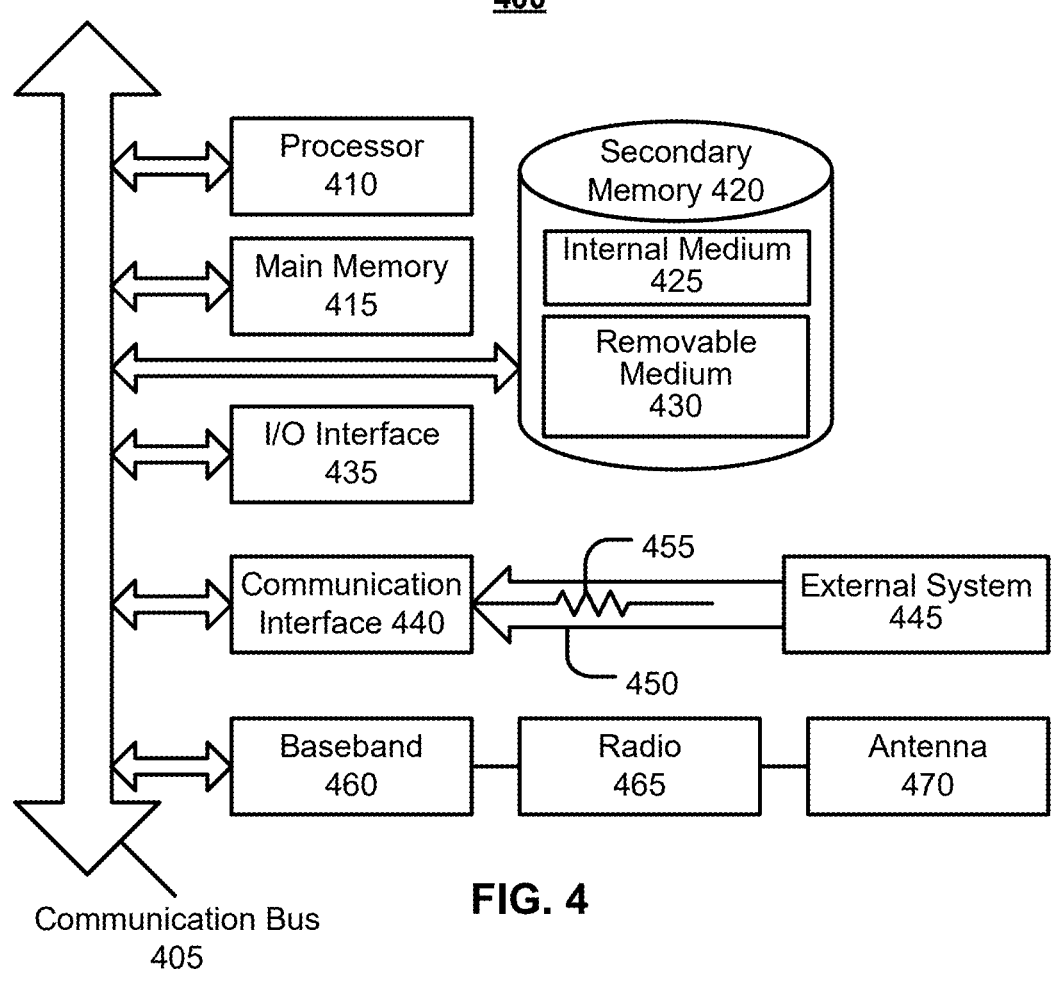
FIG. 4 illustrates an example processing system by which one or more of the processes described herein may be executed, according to an embodiment.

FIG. 4 illustrates an example processing system 400 by which one or more of the processes described herein may be executed, according to an embodiment. For example, system 400 may execute both first communication entity 110 (e.g., implementing process 200) and second communication entity 120 (e.g., implementing process 300), or first communication entity 110 and second communication entity 120 may be executed on separate systems 400. In addition, a system 400 (e.g., executing first communication entity 110 and/or second communication entity 120) may host shared memory 130. System 400 can be any processor-enabled device (e.g., server, personal computer, etc.), and may be capable of wired or wireless data communication. Other processing systems and/or architectures may also be used, as will be clear to those skilled in the art.

System 400 may comprise one or more processors 410. Processor(s) 410 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 410. Examples of processors 410 which may be used with system 400 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 410 may be connected to a communication bus 405. Communication bus 405 may include a data channel for facilitating information transfer between storage and other peripheral components of system 400. Furthermore, communication bus 405 may provide a set of signals used for communication with processor 410, including a data bus, address bus, and/or control bus (not shown). Communication bus 405 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 400 may comprise main memory 415. Main memory 415 provides storage of programs (e.g., computer-executable instructions implementing process 200 and/or 300) and data (e.g., shared memory 130) for programs executing on processor 410. It should be understood that programs stored in the memory and executed by processor 410 may be written and/or compiled according to any suitable language, including without limitation C/C++, Java, JavaScript, Perl, Python, Visual Basic, .NET, and the like. Main memory 415 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 400 may comprise secondary memory 420. Secondary memory 420 is a non-transitory computer-readable medium that may provide persistent, non-volatile storage of programs (e.g., computer-executable instructions implementing process 200 and/or 300) and data (e.g., shared memory 130) for the programs. In this description, the term "computer-readable medium" is used to refer to any non-transitory computer-readable storage media used to provide computer-executable code and/or other data to or within system 400. The programs stored on secondary memory 420 may be read into main memory 415 for execution by processor 410. Secondary memory 420 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 420 may include an internal medium 425 and/or a removable medium 430. Internal medium 425 and removable medium 430 are read from and/or written to in any well-known manner. Internal medium 425 may comprise one or more hard disk drives, solid state drives, and/or the like. Removable storage medium 430 may be, for example, a magnetic tape drive, a compact disc (CD) drive, a digital versatile disc (DVD) drive, other optical drive, a flash memory drive, and/or the like.

System 200 may comprise an input/output (I/O) interface 435. I/O interface 435 provides an interface between one or more components of system 400 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device).

System 400 may comprise a communication interface 440. Communication interface 440 allows information to be transferred between system 400 and external devices (e.g. printers), networks, or other information sources. For example, programs and/or data may be transferred to system 400, over one or more networks (e.g., including the Internet), from a network server via communication interface 440, and/or vice versa. Examples of communication interface 440 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 400 with a network or another computing device. Communication interface 440 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Information transferred via communication interface 440 is generally in the form of electrical communication signals 455. These signals 455 may be provided to communication interface 440 via a communication channel 450 between communication interface 440 and an external system 445. In an embodiment, communication channel 450 may be a wired or wireless network, or any variety of other communication links. Communication channel 450 carries signals 455 and can be implemented using a variety of wired or wireless communication means including wire or cable, fiber optics, conventional phone line, cellular phone link, wireless data communication link, radio frequency ("RF") link, or infrared link, just to name a few.

Programs, comprising computer-executable instructions, and/or data are stored in main memory 415 and/or secondary memory 420. Programs and/or data can also be received from an external system 445 via communication interface 440 and stored in main memory 415 and/or secondary memory 420. The programs, when executed, may enable system 400 to perform one or more of the processes described herein.

System 400 may comprise wireless communication components that facilitate wireless communication over a voice network and/or a data network (e.g., in the case of a mobile device, such as a smart phone). The wireless communication components comprise an antenna system 470, a radio system 465, and a baseband system 460. In system 400, radio frequency (RF) signals are transmitted and received over the air by antenna system 470 under the management of radio system 465.

In an embodiment, antenna system 470 may comprise one or more antennae and one or more multiplexors (not shown) that perform a switching function to provide antenna system 470 with transmit and receive signal paths. In the receive path, received RF signals can be coupled from a multiplexor to a low noise amplifier (not shown) that amplifies the received RF signal and sends the amplified signal to radio system 465.

In an alternative embodiment, radio system 465 may comprise one or more radios that are configured to communicate over various frequencies. In an embodiment, radio system 465 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 465 to baseband system 460.

If the received signal contains audio information, then baseband system 460 decodes the signal and converts it to an analog signal. Then the signal is amplified and sent to a speaker. Baseband system 460 also receives analog audio signals from a microphone. These analog audio signals are converted to digital signals and encoded by baseband system 460. Baseband system 460 also encodes the digital signals for transmission and generates a baseband transmit audio signal that is routed to the modulator portion of radio system 465. The modulator mixes the baseband transmit audio signal with an RF carrier signal, generating an RF transmit signal that is routed to antenna system 470 and may pass through a power amplifier (not shown). The power amplifier amplifies the RF transmit signal and routes it to antenna system 470, where the signal is switched to the antenna port for transmission.

Baseband system 460 is communicatively coupled with processor(s) 410, which have access to memory 415 and 420. Thus, programs can be received from baseband processor 460 and stored in main memory 410 or in secondary memory 420, or executed upon receipt. Such programs, when executed, can enable system 400 to perform one or more of the processes described herein.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
generate and maintain a first data structure, in shared memory, for communicating data references, to data in the shared memory, from a sender to a receiver, wherein the first data structure comprises
a first queue of the data references that is readable and writable by the sender and readable by the receiver,

24 a first write index that indicates a write position within the first queue, wherein the first write index is readable and writable by the sender and readable by the receiver, and
a first read index that indicates a read position within the first queue, wherein the first read index is readable by the sender and readable and writable by the receiver; and
by the sender,
determine to send data to the receiver,
read the first read index,
determine whether or not the first read index is plausible by
reading the first write index,
determining whether or not the first read index is greater than the first write index,
when determining that the first read index is not greater than the first write index, determining that the first read index is plausible, and
when determining that the first read index is greater than the first write index, determining that the first read index is implausible,
when determining that the first read index is implausible,
switch to a safe state, and
in the safe state, repair the first data structure by restoring the first data structure from a redundant copy of the first data structure in a local memory of the sender, and
when determining that the first read index is plausible, perform a write operation in the shared memory.

2. The method of claim 1, wherein the write operation comprises an enqueue operation that includes:
adding a new data reference to the first queue at the write position indicated by the first write index; and
updating the first write index.

3. The method of claim 2, wherein updating the first write index comprises incrementing the first write index.

4. The method of claim 2, wherein the write operation further comprises, before performing the enqueue operation:
writing at least one data item to a data region of the shared memory; and
obtaining a data reference, to an address of the at least one data item within the data region of the shared memory, as the new data reference that is added to the first queue in the enqueue operation.

5. The method of claim 1, wherein the write operation comprises modifying a data reference in the first queue.

6. The method of claim 1, further comprising, by the sender, generating and maintaining the redundant copy of the first data structure in the local memory of the sender.

7. The method of claim 1, further comprising, by the receiver:
reading the first write index;
determine whether or not the first write index is plausible;
when determining that the first write index is implausible, switching to the safe state; and
when determining that the first write index is plausible, performing a read operation in the shared memory.

8. The method of claim 7, wherein the read operation comprises a dequeue operation that includes:
reading at least one data reference from the first queue at the read position indicated by the first read index; and
updating the first read index.

9. The method of claim 8, wherein updating the first read index comprises incrementing the first read index.

10. The method of claim 8, wherein the read operation further comprises, after reading the at least one data reference from the first queue:

determining whether or not the at least one data reference is plausible;

when determining that the at least one data reference is implausible, switching to the safe state; and when determining that the at least one data reference is plausible, reading data at an address referenced by the at least one data reference from a data region of the shared memory.

11. The method of claim 10, wherein determining whether or not the at least one data reference is plausible comprises:

determining whether or not the address referenced by the at least one data reference is within the data region of the shared memory;

when determining that the address is within the data region of the shared memory, determining that the at least one data reference is plausible; and when determining that the address is not within the data region of the shared memory, determining that the at least one data reference is implausible.

12. The method of claim 10, further comprising, in the safe state, repairing the first data structure.

13. The method of claim 12, further comprising, by the receiver, generating and maintaining a redundant copy of the first data structure in local memory of the receiver, wherein repairing the first data structure comprises, by the receiver, restoring the first data structure from the redundant copy of the first data structure in the local memory of the receiver.

14. The method of claim 1, further comprising using the at least one hardware processor to:

generate and maintain a second data structure, in the shared memory, for communicating data references, to data in the shared memory, from the receiver to the sender, wherein the second data structure comprises a second queue of the data references that is readable and writable by the receiver and readable by the sender, a second write index that indicates a write position within the second queue, wherein the second write index is readable and writable by the receiver and readable by the sender, and a second read index that indicates a read position within the second queue, wherein the second read index is readable by the receiver and readable and writable by the sender.

15. The method of claim 14, further comprising using the at least one hardware processor to:

transfer ownership of data in the shared memory, from the sender to the receiver, by the sender enqueuing data references to the data onto the first queue of the first data structure; and returning ownership of the data in the shared memory, from the receiver to the sender, by the receiver enqueuing those data references to the data onto the second queue of the second data structure.

16. The method of claim 1, wherein the first queue and the first write index are not writable by the receiver, and wherein the first read index is not writable by the sender.

17. The method of claim 1, wherein the first queue and the first write index are writable by the receiver, and wherein the first read index is writable by the sender.

18. A system comprising:

at least one hardware processor;

software that is configured to, when executed by the at least one hardware processor, generate and maintain a data structure, in shared memory, for communicating data references, to data in the shared memory, from a sender to a receiver, wherein the data structure comprises a queue of the data references that is readable and writable by the sender and readable by the receiver, a write index that indicates a write position within the queue, wherein the write index is readable and writable by the sender and readable by the receiver, and a read index that indicates a read position within the queue, wherein the read index is readable by the sender and readable and writable by the receiver; and the sender that is configured to, when executed by the at least one hardware processor, determine to send data to the receiver, read the first read index, determine whether or not the first read index is plausible by reading the first write index, determining whether or not the first read index is greater than the first write index, when determining that the first read index is not greater than the first write index, determining that the first read index is plausible, and when determining that the first read index is greater than the first write index, determining that the first read index is implausible, when determining that the first read index is implausible, switch to a safe state, and in the safe state, repair the first data structure by restoring the first data structure from a redundant copy of the first data structure in a local memory of the sender, and when determining that the first read index is plausible, perform a write operation in the shared memory.

19. A non-transitory computer-readable medium having instructions stored therein, wherein the instructions, when executed by a processor, cause the processor to:

generate and maintain a first data structure, in shared memory, for communicating data references, to data in the shared memory, from a sender to a receiver, wherein the first data structure comprises a first queue of the data references that is readable and writable by the sender and readable by the receiver, a first write index that indicates a write position within the first queue, wherein the first write index is readable and writable by the sender and readable by the receiver, and a first read index that indicates a read position within the first queue, wherein the first read index is readable by the sender and readable and writable by the receiver; and by the sender, determine to send data to the receiver, read the first read index, determine whether or not the first read index is plausible by reading the first write index, determining whether or not the first read index is greater than the first write index, when determining that the first read index is not
       greater than the first write index, determining that
       the first read index is plausible, and
    when determining that the first read index is greater
       than the first write index, determining that the first
       read index is implausible, when determining that
       the first read index is implausible,
    switch to a safe state, and
    in the safe state, repair the first data structure by
       restoring the first data structure from a redundant
       copy of the first data structure in a local memory
       of the sender, and
when determining that the first read index is plausible,
    perform a write operation in the shared memory.

\* \* \* \* \*